US005163624A

United States Patent [19]

Schwartzbach

[11] Patent Number: 5,163,624

[45] Date of Patent: Nov. 17, 1992

[54] ROTOR FOR SPREADING A PARTICULATE PRODUCT

[75] Inventor: Christian Schwartzbach, MÅlov, Denmark

[73] Assignee: Niro A/S, Soborg, Denmark

[21] Appl. No.: 650,876

[22] Filed: Feb. 5, 1991

[30] Foreign Application Priority Data

Feb. 8, 1990 [EP] European Pat. Off. ........ 90610012.8

[51] Int. Cl.$^5$ .............................................. E01C 19/20

[52] U.S. Cl. .................................... 239/679; 239/672; 239/681; 239/7

[58] Field of Search ............... 239/679, 680, 681, 665, 239/671, 672, 1, 7

[56] References Cited

U.S. PATENT DOCUMENTS 1,445,265 2/1923 Bohmker ............................ 239/681
4,437,613 3/1984 Olson .................................. 239/688
4,475,692 10/1984 Walley ............................... 239/679
4,492,040 1/1985 Jensen et al. .......................... 432/15
4,555,061 11/1985 Linde ................................. 239/680
4,972,884 11/1990 Souers et al. ....................... 239/665
4,993,632 2/1991 Martin ................................ 239/679

FOREIGN PATENT DOCUMENTS 2703329 8/1978 Fed. Rep. of Germany .
3046528 7/1982 Fed. Rep. of Germany .

*Primary Examiner*—Andres Kashnikow
*Assistant Examiner*—Christopher G. Trainor
*Attorney, Agent, or Firm*—Dennison, Meserole, Pollack & Scheiner

[57] ABSTRACT

A rotor for spreading a particulate product into a fluid bed comprises a shaft or core member defining an axis of rotation. Peripherally spaced spreading members extend outwardly from the shaft or core member, and the radial extensions of peripherally adjacent spreading members are different viewed in transverse sections of the rotor. The spreading members may form vanes or wings extending axially along the shaft or core member, and the spacing of the free edge of each vane or wing from the axis of rotation may vary along the length of the rotor.

19 Claims, 2 Drawing Sheets

ROTOR FOR SPREADING A PARTICULATE PRODUCT

BACKGROUND OF THE INVENTION

1. Field of the Invention

The present invention relates to a rotor for spreading a particulate product into a fluid bed.

2. Description of Prior Art

A particulate product to be treated in a fluid bed of the back mixed type should preferably be fed to the fluid bed so that the product particles are distributed over a large bed area. U.S. Pat. No. 4,492,040 discloses a fluid bed dryer in which the particulate product fed to a fluid bed of the back mixed type is distributed over a large area by means of a centrifugal spreading rotor mounted for rotation about a vertical axis. It is also known to feed particulate solid fuel into a fluid bed combustor by means of an overbed spreader comprising a rotor mounted at the refractory wall of the combustion chamber and rotating about a horizontal axis.

For such spreading rotors for feeding a particulate product into a fluid bed and for several other applications it is a goal to obtain a substantially even distribution of the product particles, which may be differently sized, over a large area. However, this goal cannot be reached by means of any of the known spreading rotors.

SUMMARY OF THE INVENTION

The present invention provides an improved spreading rotor of the above type, by means of which it is possible to obtain a more even distribution of a particulate product.

Thus, the present invention provides a rotor for spreading a particulate product into a fluid bed and comprising a shaft or core member defining an axis of rotation, and peripherally spaced spreading members extending outwardly from the shaft or core member, peripherally adjacent spreading members having different radial extensions in transverse sections of the rotor. This means that the velocity of the free ends of the spreading members in each such section will be different. Consequently, the particles hit by the various spreading members in one and the same radial section of the rotor will be differently influenced and obtain different momentums, whereby a greatly improved spreading effect may be obtained.

Each spreading member may extend in a radial plane containing the axis of the rotor or it may extend peripherally as well as radially so as to define an acute angle with such plane. Furthermore, the spreading members may be plane or slightly curved.

The spreading members may be radially extending separate spreading arms of different lengths. In a preferred embodiment, however, the spreading members are vanes or wings extending axially along the shaft, each having a free edge, the spacing of the free edge from the axis of rotation varying along the length of the rotor. Each of the vanes may extend helically around the shaft or core member of the rotor. Alternatively, each of the vanes or wings may extend in a plane, which contains or is parallel to the axis of the rotor.

The free edge of one or more of the vanes or wings may define a stepped curve. However, in the preferred embodiment the free edge of each vane defines a continuous curve without steps. Thus, the free edge of each vane or wing may define a continuous curve extending between minimum and maximum values of the radial spacing of the free edge from the axis of the rotor. This curve may have a convex or concave shape with one or more maximum values, which may be identical or different, and one or more minimum values, which may also be identical or different. The curve defined by the free edges of each vane or wing may comprise a sine curve, an ellipse, a hyperbola, and/or a parabola, and/or one or more parts of any of such curves.

The free edge of each vane or wing is preferably composed by sections of a base curve common to all of the vanes or wings. Such base curve may have any suitable shape and may, for example, be one of the above curves or part thereof.

The free edge of at least one of said vanes or wings may define a concave curve extending between maximum values at the ends of the rotor and a minimum value at the middle of the rotor. Additionally or alternatively, at least one of the vanes or wings may define a convex curve extending between minimum values at the ends of the rotor and a maximum value at the middle of the rotor. Such curves may be symmetrical or non-symmetrical about a line perpendicular to the rotor axis. The free edge of at least one of the vanes or wings may define the above base curve, and such base curve may be concave and/or convex. In the latter case the base curve may extend between minimum values at the ends of the rotor and a maximum value at the middle of the rotor, and the base curve may or may not be symmetrical about a line perpendicular to the rotor axis and extending through the middle of the rotor. As an example, the base curve may be a sine curve or part thereof.

In the preferred embodiment of the rotor according to the invention the curve defined by the free edge of each vane or wing is displaced by a distance L/n along the length of the rotor in relation to the curve of an adjacent vane or wing. L being the length of each vane or wing, and n being the total number of vanes or wings or a fraction thereof. If, for example, the total number of vanes of the rotor is eight, the curve may be displaced by a distance L/4 along the length of the rotor in relation to the curve of an adjacent vane, this means that each pair of diametrically opposed, oppositely directed vanes will be symmetrical in relation to the center of an axial section through such diametrically opposite vanes.

The present invention further provides a method of spreading or distributing a particulate product by means of the above rotor, said method comprising rotating the rotor with its axis arranged substantially horizontally, and directing a flow of the product to be distributed into contact with the vanes or wings of the rotor. In order to utilize the rotor to an optimum, the product is preferably fed to the rotor as a curtain-like falling flow extending substantially parallel with the axis of the rotor and having a width corresponding substantially to the axial length of the vanes or wings.

The spreading pattern of the particulate product and the area covered by the spread product are dependent on the rotational speed of the rotor. Therefore, the rotational speed may be controlled dependent on the operational conditions of the apparatus or plant in which the spreading rotor is used. Furthermore, the rotational speed of the rotor may be controlled, for example in response to the flow rate at which product is supplied to the rotor and/or one or more characteristics of the product supplied. Thus, for example, the rotational speed may be increased in response to an increasing product flow rate and vice versa.

As an example, the product may comprise a fluidizable particulate product, and the rotor may be arranged above a fluid bed so as to distribute the particulate product over a substantial area of the fluid bed.

BRIEF DESCRIPTION OF THE DRAWINGS

The invention will now be further described with reference to the drawings, wherein.

DESCRIPTION OF A PREFERRED EMBODIMENT

Figure 1:
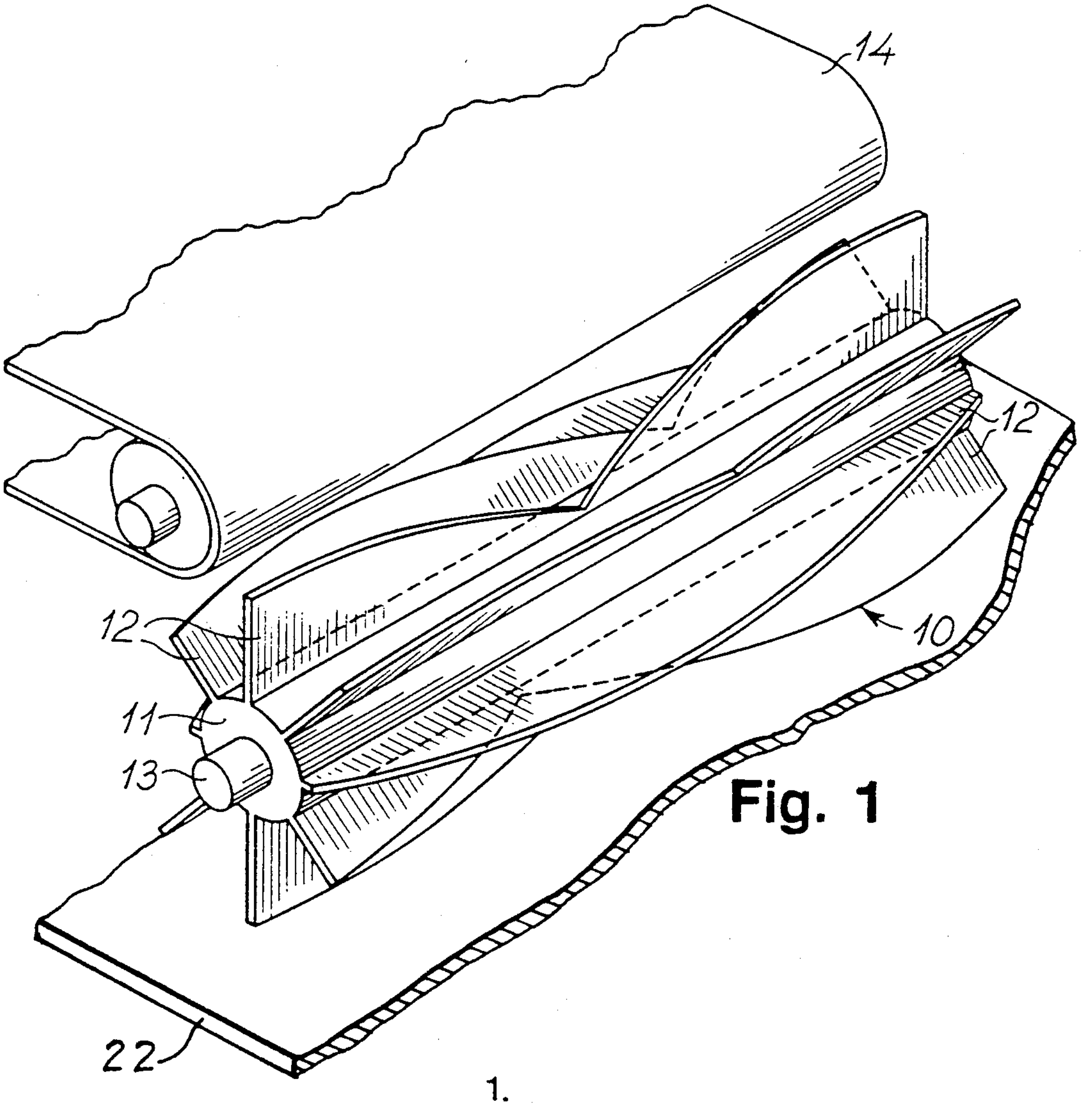
FIG. 1 is a perspective view of an embodiment of the spreading rotor according to the invention and of an end portion of a conveyor belt for supplying a flow of a particulate product thereto.

FIG. 1 shows a spreading rotor 10 comprising a cylindrical core member 11, which may be hollow or solid, and a plurality of mutually uniformly peripherally spaced vanes or wings 12 each extending axially along the length of the core member and radially outwardly therefrom. The rotor 10 may be mounted for rotation about a substantially horizontal axis by means of stud shafts 13 extending axially from the opposite ends of the core member 11. The rotor may be rotated by means of an electric motor or another driving means (not shown) through a belt, chain, or another force-transmitting device (also not shown).

The rotating spreading rotor 10 may, for example, be used for distributing or spreading a particulate product supplied by a conveyor belt 14, substantially evenly over a large area. As an example, the rotor 10 may be used for distributing a particulate product to be treated over a fluid bed 22, in which the product is to be treated, as described more in detail in U.S. patent application Ser. No. 07/650,878 . . . entitled "Method and Apparatus for Heat-treating a Moist, Particulate Product" and filed simultaneously with the present application (ref. No. 428395), which application is hereby incorporated herein by reference.

Figure 2:
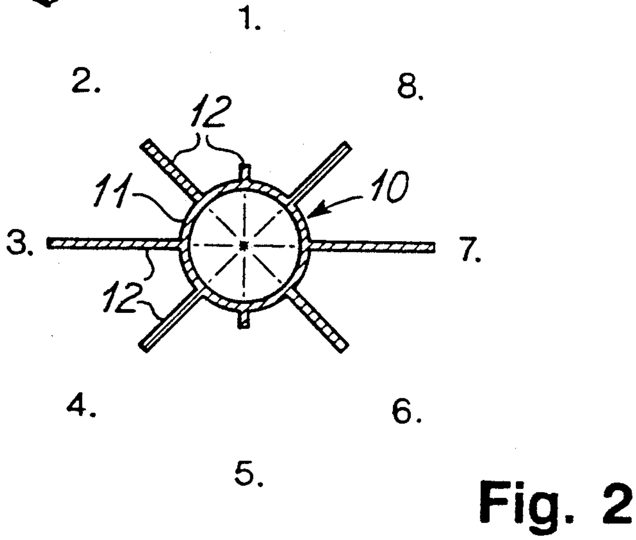
FIG. 2 is a central cross-sectional view of the rotor shown in FIG. 1, and FIG. 3 are plan views showing the contours of pairs of diametrically oppositely directed vanes or wings of the rotor shown in FIGS. 1 and 2.
Figure 3:
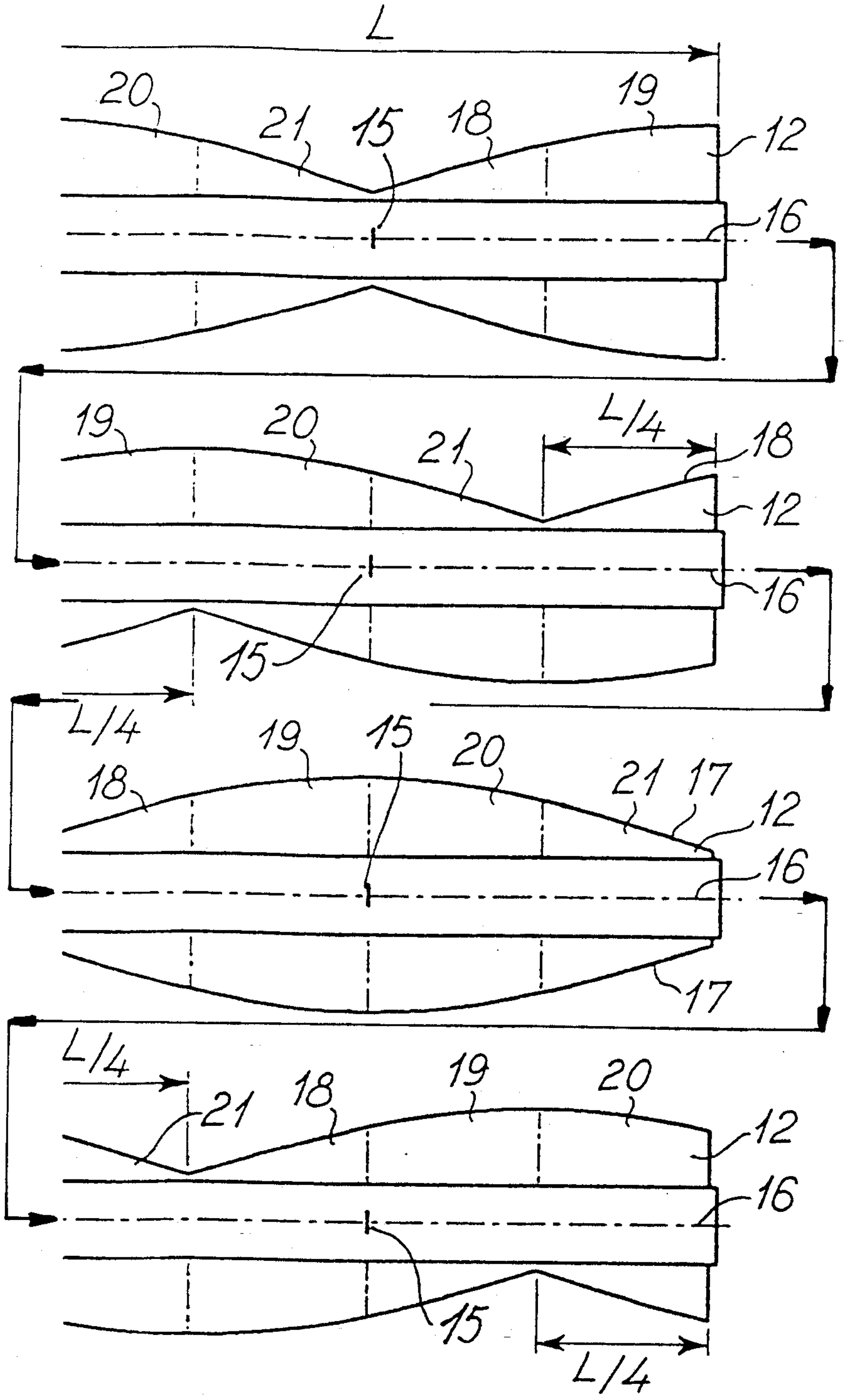

The rotor 10 preferably has an even number—for example eight-vanes or wings 12 forming diametrically oppositely directed pairs of wings, which are illustrated in FIG. 3. The wings of each pair are congruently shaped and arranged symmetrically to a midpoint 15 on the shaft axis 16. The free edges 17 of the pair of opposite vanes or wings 12, which are numbered 3 and 7, respectively, in FIGS. 2 and 3, each defines a convex curve, such as part of a sine curve. This sine curve has its maximum value at the midpoint 15 of the core member or shaft 11 and is symmetrical about a line extending perpendicular to the shaft axis 16 through the midpoint 15. Thus, for each of the wings or vanes numbered 3 and 7, the radial extension varies continuously from about zero at the ends of the core member 11 to a maximum value at the midpoint 15 thereof. Each of the vanes or wings numbered 3 and 7 defining the base curve 17 may be divided into four longitudinal sections 18–21 each having a length being ¼ of the total length L of the vane or wing. As appears from FIG. 3 any of the vanes or wings is composed by four such longitudinal vane sections or curve sections 18–21. More specifically, the curve defined by the free edge of any of the vanes or wings 12 is axially displaced ¼ of the total length L of the vanes 12 along the core member 11 in relation to the curve defined by the free edge of an adjacent vane or wing. Thus, while the maximum value of the radial vane extension is found at the midpoint 15, and the minimum values are found at the free ends of the core member 11 for the oppositely directed wings designated 3 and 7 in FIGS. 2 and 3, the maximum and minimum values are found displaced by L/4 from the free ends of the core member for the adjacent vanes or wings designated 2, 4, 6, and 8. The maximum value of the radial extension of the vanes designated 1 and 5 are found at the free ends of the vanes, while the minimum values are found at the midpoint 15.

It is understood that in each cross-section perpendicular to the rotor axis 16 the vanes or wings 12 will function like radial extending arms having different radial extensions. This means that the particles of a particulate product supplied to the rotor 10 by the conveyor belt 14 as a falling stream will be hit by vanes or wings with different maximum peripheral velocities, so that the particles may be spread substantially evenly over a large area. Due to the symmetrical opposite arrangement of the vanes, the rotor is dynamically well balanced.

I claim:

1. A rotor for spreading a particulate product into a fluid bed and comprising a shaft defining an axis of rotation, and a plurality of peripherally spaced, axially coextending spreading members extending outwardly from the shaft, wherein peripherally adjacent pairs of the axially coextending spreading members have different radial extensions in transverse sections of the rotor.

2. A rotor according to claim 1, wherein said spreading members are vanes extending axially along the shaft, each of said vanes having a free edge, the spacing of the free edge from the axis of rotation varying along the length of the rotor.

3. A rotor according to claim 2, wherein said free edge along the length of the rotor defines a continuous curve extending between minimum and maximum values of said spacing.

4. A rotor according to claim 2, wherein the free edge of each of said vanes is composed by sections of a base curve common to all of the vanes.

5. A rotor according to claim 4, wherein the free edge of at least one of said vanes defines a convex base curve extending between minimum values at the ends of the rotor and a maximum value at the middle of the rotor.

6. A rotor according to claim 5, wherein said base curve is a sine curve or part thereof.

7. A rotor according to any of the claims 3–6, wherein the curve defined by the free edge of each of said vanes is displaced by a distance L/n along the length of the rotor in relation to the curve of an adjacent vane, L being the length of the vanes, and n being the total number of vanes or a fraction thereof.

8. A rotor according to claim 7, wherein n is half the total number of vanes of the rotor.

9. A rotor according to claim 8, wherein the total number of vanes of the rotor is eight.

10. A method of spreading or distributing a particulate or liquid product by means of a rotor including a shaft or core member defining an axis of rotation, and a plurality of peripherally spaced, axially extending vanes or wings extending outwardly from the shaft, wherein peripherally adjacent pairs of the axially extending vanes have different radial extensions in transverse sections of the rotor, said method comprising rotating the rotor with its axis arranged substantially horizontally, and directing a flow of the product to be distributed into contact with the vanes of the rotor, the vanes of said rotor applying different momentums to said product so as to improve the distribution of the product.

11. A method according to claim 10, wherein the product flow is a curtain-like falling flow extending substantially parallel with the axis of the rotor and having a width corresponding substantially to the axial length of the vanes.

12. A method according to claim 10, wherein the rotational speed of the rotor is controlled in response to the flow rate at which product is supplied to the rotor.

13. A method according to any of the claims 10-12, wherein the product comprises a fluidizable particulate product, and the rotor is arranged above a fluid bed so as to distribute the particulate product over a substantial area of the fluid bed.

14. A method according to claim 10, wherein the rotational speed of the rotor is controlled in response to characteristics of the product supplied.

15. A rotor for spreading a particulate product into a fluid bed and comprising a shaft member defining an axis of rotation, a plurality of peripherally spaced vanes extending axially along the shaft, the spacing of a free edge of each of said vanes from the axis of rotation varying along the length of the rotor, and the spacing of said free edge of peripherally adjacent pairs of the vanes being different in transverse sections of the rotor, the curve defined by the free edge of each of said vanes being displaced a length L/n along the length of the rotor in relation to the curve of an adjacent vane, L being the length of the vanes, and n being the total number of vanes.

16. A rotor according to claim 15, wherein n is half the total number of vanes of the rotor.

17. A rotor according to claim 16, wherein the total number of vanes of the rotor is eight.

18. A method of spreading or distributing a particulate or liquid product over a fluid bed by means of a rotor including a shaft defining an axis of rotation, a plurality of peripherally spaced, radially and axially extending vanes extending along the shaft and wherein peripherally adjacent pairs of the axially extending vanes each have different radial extensions in transverse sections of the rotor, said method comprising:

producing a curtain-like falling flow of said product extending parallel with the axis of said rotor, rotating said rotor axis horizontally to apply different momentum to said product along the length of each of said axially extending vanes to generate a uniform distribution of said product over the fluid bed.

19. The method according to claim 18, wherein said uniform distribution of said product over the fluid bed is achieved in both a vertical and a horizontal plane.

* * * * *